(12) United States Patent
Osako et al.

(10) Patent No.: US 6,248,181 B1
(45) Date of Patent: Jun. 19, 2001

(54) COMPOSITION AND METHOD FOR HYDROPHILIC TREATMENT OF ALUMINUM OR ALUMINUM ALLOY

(75) Inventors: Tomohiro Osako; Hiroki Kojima; Masahiro Motozawa, all of Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 09/252,992

(22) Filed: Feb. 19, 1999

(30) Foreign Application Priority Data

Feb. 19, 1998 (JP) .................................................. 10-054431

(51) Int. Cl.[7] .................................................. C23C 22/48
(52) U.S. Cl. ........................ 148/247; 148/251; 148/267; 106/14.15; 252/390
(58) Field of Search .................................. 148/247, 251, 148/267, 275; 106/14.15; 252/390

(56) References Cited

U.S. PATENT DOCUMENTS

| 4,705,821 | 11/1987 | Ito et al. . | |
|---|---|---|---|
| 4,954,372 | * 9/1990 | Sako et al. | 427/388.2 |
| 5,009,962 | 4/1991 | Yamasoe . | |
| 5,122,202 | 6/1992 | Dykstra et al. . | |

FOREIGN PATENT DOCUMENTS

| 24 52 483 | 5/1975 | (DE) . |
|---|---|---|
| 63-171683 | 7/1988 | (JP) . |
| 63-171684 | 7/1988 | (JP) . |
| 63-318496 | 12/1988 | (JP) . |
| 1-270977 | 10/1989 | (JP) . |
| WO 93/15155 | 8/1993 | (WO) . |

* cited by examiner

*Primary Examiner*—John Sheehan
*Assistant Examiner*—Andrew L. Oltmans
(74) *Attorney, Agent, or Firm*—Nixon & Vanderhye

(57) ABSTRACT

Here are provided a composition for hydrophilic treatment of aluminum or aluminum alloy which can form film having persistent corrosion resistance and hydrophilicity and not generating odor, and a method for hydrophilic treatment.

Namely, provided by the invention are a composition for hydrophilic treatment of aluminum or an aluminum alloy which comprises (P1) a water-soluble polymer having as a constitution unit monomer(s) (I) represented by the formula

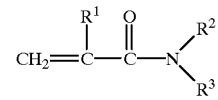

wherein, $R^1$ represents a hydrogen atom or a methyl group, and $R^2$ and $R^3$ are the same or different, and each represent a hydrogen atom, an alkyl group having 1 to 4 carbon atoms, a benzyl group or a hydroxyalkyl group having 2 or 3 carbon atoms, and obtained by homopolymerization or copolymerization of the monomer(s) (I), (A) a water-soluble trivalent chromium compound, (B) a water-soluble zirconium compound or titanium compound, and, if necessary, further water, and wherein the mutual rate of P1, A and B is such that, based on 100 weight parts of the solid matter of P1, A is 0.01 to 70 weight parts and B is 0.001 to 70 weight parts, and a method for hydrophilic treatment using it.

8 Claims, No Drawings

COMPOSITION AND METHOD FOR HYDROPHILIC TREATMENT OF ALUMINUM OR ALUMINUM ALLOY

BACKGROUND OF THE INVENTION

1. Field of the Invention

This invention relates to a composition for hydrophilic treatment of aluminum or aluminum alloy and a method for hydrophilic treatment using it. More detailedly, this invention relates to a composition for hydrophilic treatment for giving excellent hydrophilicity, deodorant properties and corrosion resistance over a long period to aluminum or aluminum alloy, more detailedly aluminum or aluminum alloy materials, aluminum or aluminum alloy products, for example aluminum or aluminum alloy-made heat exchangers, etc., and a method for hydrophilic treatment of aluminum or aluminum alloy using the composition.

2. Statement of Related Art

Heretofore, many of aluminum or aluminum alloy-made heat exchangers are designed so that the areas of the heat-radiating parts and the cooling parts can be as large as possible so as to heighten heat radiation or cooling effect, and therefor, the intervals among the fins are extremely narrow. Further, notches called louvres are made among the fins so as to make draft resistance as small as possible.

Thus, when such a heat exchanger is used for cooling, moisture in the air aggregates on the surface of the heat exchanger, particularly among the fins, the aggregated water is liable to be water droplets in proportion as the hydrophobicity of the fin surface increases, and the water droplets often cause clogging at the fin gaps to increase draft resistance and lower heat exchange rate.

Further, the water droplets which collected at the fin gaps tend to scatter by the blower of the heat exchanger, and it often occurs that the pan installed at the lower part of the heat exchanger cannot receive all the scattered water droplets and the neighborhood of the heat exchanger is soiled with water.

Therefore, in order to prevent water droplets from remaining at the fin gaps and causing clogging, some treatments for giving hydrophilicity to the surface of the aluminum or the alloy thereof and enhancing water wettability have been proposed and put into practice.

Heretofore, agents for hydrophilic treatment applied on the fin surfaces of aluminum or aluminum alloy-made heat exchangers are roughly classified into two kinds, namely those wherein organic macromolecules are bound or added to inorganic compounds, especially alkali silicates, and those composed of organic macromolecules alone. The former ones have better hydrophilicity and hydrophilicity persistency than the latter ones, and are more often used on the market. However in recent years, the problem of offensive odor generated from heat exchangers has been highlighted, and its cause is supposed to be due to scattering of the inorganic compounds.

As to usual aluminum or aluminum alloy-made heat exchangers for car air conditioners, an aluminum or aluminum alloy coil material is cut, punching molded and welding processed, and then assembled into aluminum or aluminum alloy-made heat exchangers. Then, the assembled heat exchangers are subjected, after a proper pre-washing, to a chemical conversion treatment for giving corrosion resistance such as chromic acid chromate treatment, and then subjected to a hydrophilic treatment as above-mentioned.

The reason that the chemical conversion treatment for giving corrosion resistance is carried out before the hydrophilic treatment is that hydrophilic treatment, as above-mentioned, alone cannot give corrosion resistance to aluminum or aluminum alloy-made heat exchangers.

However, it is troublesome to carry out corrosion resistance and hydrophilic treatments separately, and moreover, a washing step and a draining step such as air blow generally become necessary after the chemical conversion treatment, and therefore, steps further increase and the equipment becomes larger and more complicated. Further, as to chromic acid chromates and phosphoric acid chromates generally used for chemical conversion treatments, hexavalent chromium harmful to human bodies is contained in the treating agents, and therefore, there is the possibility that they have a bad influence on the environment and waste water treatment.

Various methods have been proposed for solving these problems. For example, Japanese Published Unexamined Patent Application No. 318496/1988 discloses "a method for surface treating heat exchangers which comprises giving hydrophilicity, corrosion resistance, antibacterial properties and antifungal properties by one surface treatment step" for omitting chemical conversion treatment. However, constituents therefor are not explicitly described even in examples as well as in claims, and are poor in specificity.

Japanese Published Unexamined Patent Application No. 171684/1988 discloses "a method for applying an aqueous agent for hydrophilic treatment, capable of giving corrosion resistance". Therein, film giving corrosion resistance and hydrophilicity is formed, on aluminum or aluminum alloy materials, by a resin synthesized from particular monomers. However, hydrophilicity given by this method is not yet enough, and in many cases, the method is generally used only for forming a substrate for hydrophilic films.

Further, Japanese Published Unexamined Patent Application No. 270977/1989 discloses "a method for hydrophilic treatment of aluminum or aluminum alloy, which gives both good hydrophilicity and good corrosion resistance". Therein, film giving corrosion resistance and hydrophilicity is formed from a particular polymer polymer P1, a polymer P2 having a particular functional group and a crosslinking agent. However, hydrophilic film formed by this method contains hexavalent chromium, which is environmentally undesirable.

Thus, a composition for hydrophilicity-giving treatment, not containing hexavalent chromium, which can form uniform film having hydrophilicity persistent over a long period and good corrosion resistance without substrate film, by directly applying it on the surface of aluminum or aluminum alloy products such as aluminum or aluminum alloy-made heat exchangers, has not yet been developed.

DESCRIPTION OF THE INVENTION

Objects of the Invention

This invention has been made for solving the problems which the above prior art has, and the object of the invention is to provide a composition for hydrophilic treatment which can form films showing excellent corrosion resistance over a long period, and, over a long period, not forming odor and capable of sustaining excellent hydrophilicity, without using any substrate film used generally, by directly applying it on the surface of aluminum or aluminum alloy products such as aluminum or aluminum alloy-made heat exchangers, and a method for hydrophilic treatment using the composition.

SUMMARY OF THE INVENTION

The present inventors intensely studied on means for solving the above problems, and as a result, they found that these problems can be solved by applying a composition for hydrophilic treatment, which contains a polymer having a particular structure, a water-soluble trivalent chromium compound, and a water-soluble zirconium compound or a water-soluble titanium compound, onto the surface of aluminum or aluminum alloy, and completed the invention.

Namely, the invention relates to a composition for hydrophilic treatment of aluminum or aluminum alloy which comprises (P1) a water-soluble polymer obtained by homopolymerizing one of monomers (I) represented by the general formula

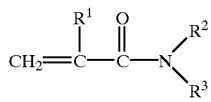

wherein, $R^1$ represents a hydrogen atom or a methyl group, and $R^2$ and $R^3$ are the same or different, and each represent a hydrogen atom, an alkyl group having 1 to 4 carbon atoms, a benzyl group or a hydroxyalkyl group having 2 or 3 carbon atoms, obtained by copolymerizing two or more of monomers (I), obtained by copolymerizing monomer(s) (I) with other monomer(s) (II) copolymerizable with the monomer(s) (I) or salt(s) of the monomer(s) (II) under such a condition that the rate of the monomer(s) (I) in the total monomers is 40% by mol or more, or obtained by subjecting the resultant homopolymer or copolymer to conventional modification, (A) a water-soluble trivalent chromium compound, (B) a water-soluble zirconium compound or titanium compound, and, if necessary, further water, and wherein the mutual rate of P1, A and B is such that, based on 100 weight parts of the solid matter of P1, A is 0.01 to 70 weight parts and B is 0.001 to 70 weight parts.

When the above composition for hydrophilic treatment of aluminum or aluminum alloy further contains, in an amount of 1 to 400 weight parts based on 100 weight parts of P1 in solid matter basis, (P2) a water-soluble polymer obtained by homopolymerization of any of monomers (III) having in the molecule a carboxyl group, a sulfonic acid group, a phosphonic acid group, a primary amino group, a secondary amino group, a tertiary amino group, a quaternary ammonium group, a hydroxyl group, a glycidyl group or an amido group, and being different from monomers (I), and salts of monomers (III) or copolymerization of two or more of monomers (III) and salts thereof, or obtained by copolymerization of monomer(s) (III) or salt(s) thereof with nonioic monomer(s) copolymerizable with the monomer(s) (III) or salt(s) thereof but having neither a hydroxyl group, a glycidyl group nor an amido group, the water-soluble polymer (P2) being such that the rate of the monomer(s) (III) or salt(s) thereof in the total monomers is 40% by mol or more, the hydrophilicity of the aluminum or the aluminum alloy can further be enhanced.

Further, when the above composition for hydrophilic treatment of aluminum or aluminum alloy further contains an antibacterial agent having a decomposition temperature of 100° C. or more, rotting odor due to metabolites of microorganisms proliferating at the fin gaps can be prevented.

The invention also relates to a method for hydrophilic treatment of aluminum or aluminum alloy which comprises applying the above composition for hydrophilic treatment of aluminum or aluminum alloy onto the surface of the aluminum or aluminum alloy, and drying to form hydrophilic film having a film thickness of 0.05 to 20 μm.

DESCRIPTION OF PREFERRED EMBODIMENTS

The invention is detailedly described below.

The "composition and method for hydrophilic treatment of aluminum or aluminum alloy" in the invention is assumed to mean a composition and a method for treatment to make the surface of aluminum or aluminum alloy hydrophilic.

The "monomer" in the invention is assumed to mean a monomer having an ethylenical double bond and capable of polymerizing or copolymerizing thereby.

The "water-soluble polymer" in the invention is assumed to include, according to a custom of the art, both of a water-soluble polymer itself as solid matter and a water-soluble polymer as an aqueous solution, and when both are referred to separately, it is assumed to add the word of "solid matter" or "aqueous solution".

As apparent from the above, water-soluble polymer can be an aqueous solution of the water-soluble polymer obtained by homopolymerizing or copolymerizing respective components and then, if necessary, modifying the resultant homopolymer or copolymer, or can be the solid matter of the water-soluble polymer obtained by mere separation or purification and isolation. Namely, it causes no inconvenience if a polymerization initiator used in preparation of water-soluble polymers, and other additives usually used in polymerization or modification are contained in the composition of the invention, so long as the object of the invention is not hindered thereby.

First, the composition for hydrophilic treatment of aluminum or aluminum alloy is described.

As the water-soluble polymer designated P1, there can, first, be mentioned a water-soluble polymer (P1–1) obtained by homopolymerization of the monomer (I) or copolymerization of two or more of monomers (I). In the case of such a copolymer, there is no limitation on their mutual rate.

As monomers (I), there can be mentioned acrylamide, methacrylamide, N-methylacrylamide, N,N-dimethylacrylamide, etc. Only for convenience, acrylamide, methacrylamide, N-methylacrylamide and N,N-dimethylacrylamide are hereinafter referred to, individually to as a whole, as monomers (I').

As the water-soluble polymer designated P1, there can, also, be mentioned a water-soluble monomer (P1–2) obtained by copolymerizing monomer(s) (I) with monomer(s) (II) other than monomers (I) or salt(s) of the monomer(s) (II), copolymerizable with the monomer(s) (I), under such a condition that the rate of the monomer(s) (I) in the total monomers is 40% by mol or more.

There is no particular limitation on the monomer(s) (I) to be copolymerized with monomer(s) (II), so long as they are monomer(s) (I), but it is preferred that they are monomer(s) (I'). Monomers (I) can be used alone or in combination of two or more of them.

As monomers (II), there can be mentioned nonionic monomers (II-1), cationic monomers (II-2) and anionic monomers (II-3) different from monomers (I).

Monomers (II) can be used alone or in combination of two or more of them.

As nonionic monomers (II-1), there can, for example, be mentioned 2-hydroxyalkyl (C=2, 3) (meth)acrylate, diacetoneacrylamide, N-methylolacrylamide, acryloylmorpholine, acrylonitrile, alkyl (C=1~6) (meth)acrylate, styrene, vinyl acetate, etc.

As cationic monomers (II-2), there can, for example, be mentioned ones represented by the following general formula:

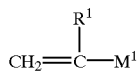

Therein, $R^1$ represents a hydrogen atom or a methyl group, and $M^1$ represents a group giving cationic properties, and, for example, include the following ones.

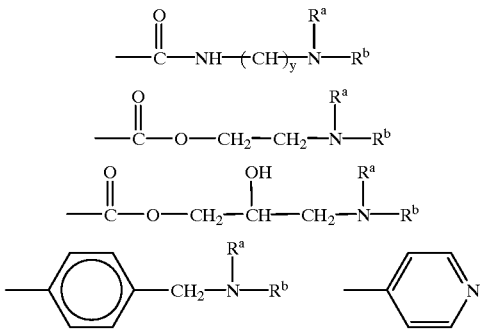

wherein, $R^a$ and $R^b$ are the same or different, and each represent a hydrogen atom, an alkyl group (C=1~6, particularly 1, 2), a hydroxyalkyl group (the alkyl has C=1~6, particularly 1, 2), a phenyl group or a benzyl group, and y represents an integer of 1~3).

As the salts of cationic monomers (II-2), there can be mentioned salts with inorganic acids such as hydrochloric acid and sulfuric acid and salts with organic acids such as acetic acid and citric acid, and further, adducts of alkyl halides (methyl chloride, ethyl chloride, etc.), alkyl sulfates (methyl sulfate, ethyl sulfate, etc.) or the like, and quaternary ammonium salts obtained by reaction with dimethyl-diallyl ammonium salts (chlorides, sulfates, etc.) or with chloromethylstyrene and a tertiary amine (triethylamine, etc.), etc.

As anionic monomers (II-3), there can, for example, be mentioned ones represented by the following general formula, other unsaturated carboxylic acids such as maleic anhydride and itaconic acid, etc.

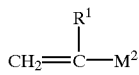

Therein, $R^1$ represents a hydrogen atom or a methyl group, and $M^2$ represents a group giving anionic properties, and, for example, include the following ones.

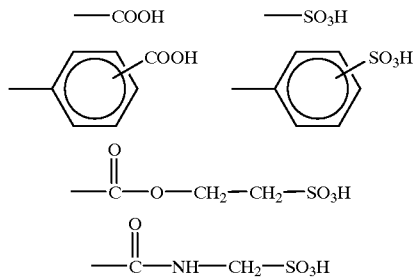

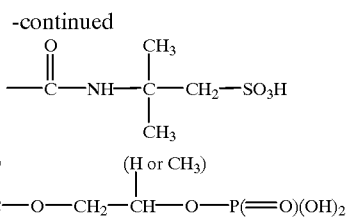

As the salts of anionic monomers (II-3), there can be mentioned sodium salts, potassium salts, ammonium salts, salts with amines such as triethylamine, etc.

The compositions of the water-soluble polymers (P1-2) can thus be represented as follows.

Nonionic polymers represented by the general formula

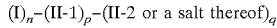

(wherein, $n \geq 40$, $p=1~60$, $n+p=100$),

Cationic polymers represented by the general formula $(I)_n-(II-1)_p-(II-2 \text{ or a salt thereof})_q$ (wherein, $n \geq 40$, $p=0~59$, $q=1~60$, $n+p+q=100$), Anionic polymers represented by the general formula

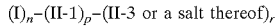

(wherein, $n \geq 40$, $p=0~59$, $r=1~60$, $n+p+r=100$), or

Amphoteric polymers represented by the general formula

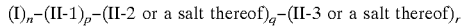

(wherein, $n \geq 40$, $0 \leq p < 30$, $q=1~59$, $r=1~59$, $n+p+q+r=100$).

As water-soluble polymers represented by P1, there can also be mentioned water-soluble polymers (P1-3) obtained by subjecting the thus obtained homopolymers or copolymers, namely water-soluble polymers (P1-1) or (P1-2) to conventional modifications.

As examples of the conventional modifications, there can be mentioned

1) Conversion of amido groups to carboxyl groups through hydrolysis
2) Conversion of amido groups to amino groups through Hofmann rearrangement
3) Conversion of amido groups to —CONH—CH$_2$—N(R$^4$)(R$^5$) through Mannich reaction using HN(R$^4$)(R$^5$) and formaldehyde
   (wherein, $R^4$ and $R^5$ are the same or different, and each represent an alkyl group having 1 to 4 carbon atoms, a hydroxyalkyl group having 2 or 3 carbon atoms or a benzyl group)
4) Introduction of —CONH—R$^6$—NH$_2$ through reaction of the side chain ester groups with alkylenediamine (H$_2$N—R$^6$—NH$_2$)
   (wherein, R$^6$ represents an alkylene group having 2 to 6 carbon atoms)
5) Conversion of (substituted) amino groups obtained by the reactions of 2) to 4) to quaternary ammonium through alkylation, etc.

There is no particular limitation about the process for the homopolymerization or copolymerization for obtaining the water-soluble polymer (Pi) of the invention, and the process can be carried out according to conventional processes. For example, one or two or more monomers are dissolved or suspended in water, and polymerization is carried out at a reaction temperature of 50 to 100° C. using potassium persulfate or the like as a polymerization initiator and sodium thiosulfate or the like as a polymerization accelerator. For adjustment of polymerization degree, there can be used secondary alcohols, mercaptosuccinic acid, etc. as chain transfer agents.

Further, the modifications (hydrolysis, Hofmann rearrangement, Mannich reaction, conversion to quaternary ammonium compounds, etc.) of the thus obtained homopolymers or copolymers in the case of necessity can be carried out according to conventional processes.

It is suitable, for securing the durability of the film, that the molecular weight of the obtained water-soluble polymer (P1) is 5,000 or more according to gel permeation chromatography (GPC) using a polyacrylic acid ester as a standard substance. The molecular weight is preferably 5,000 to 300,000, more preferably 10,000 to 100,000.

As the water-soluble trivalent chromium compounds (A), there is no particular limitation, and there can, for example, be mentioned chromium sulfate, chromium nitrate, chromium fluoride, chromium acetate, chromium chloride, chromium biphosphate, etc.

In general, it is necessary that the use amount of the water-soluble trivalent chromium compound (A) is 0.01 to 70 weight parts per 100 weight parts of the solid matter of the water-soluble polymer (P1), and the use amount is referably 0.1 to 50 weight parts, more preferably 1 to 50 weight parts, still more preferably 5 to 40 weight parts. When the compounding amount is less than 0.01 weight part, the corrosion resistance is insufficient, and when it is more than 70 weight parts, there is the possibility that odor is generated.

As the water-soluble zirconium compounds or titanium compounds (B), there is no particular limitation, and there can, for example, be mentioned zirconium acetate, zirconium nitrate, zirconium chloride, hexafluorozirconic acid and its salts (Na salt, K salt, etc.), zirconium sulfate, zirconium carbonate, hexafluorotitanic acid and its salts (Na salt, K salt, etc.), titanium sulfate, etc.

In general, it is necessary that the use amount of the water-soluble zirconium compounds or titanium compounds (B) is 0.001 to 70 weight parts per 100 weight parts of the solid matter of the water-soluble polymer (P1), and the use amount is preferably 0.1 to 50 weight parts, more preferably 0.5 to 50 weight parts, still more preferably 1 to 40 weight parts. When the compounding amount is less than 0.001 weight part, the corrosion resistance is insufficient, and when it is more than 70 weight parts, there is the possibility that odor is generated.

As to the composition of the invention for hydrophilic treatment of aluminum or aluminum alloy, as stated above, the object of the invention can be accomplished so long as it comprises the above components P1, A and B, and, if necessary, further water. However, when the composition further contains, in an amount of 1 to 400 weight parts based on 100 weight parts of P1 in solid matter basis, (P2) a water-soluble polymer obtained by homopolymerization of any of monomers (III) having in the molecule a carboxyl group, a sulfonic acid group, a phosphonic acid group, a primary amino group, a secondary amino group, a tertiary amino group, a quaternary ammonium group, a hydroxyl group, a glycidyl group or an amido group, and being different from monomers (I), and salts of monomers (III), or copolymerization of two or more of monomers (III) and salts thereof, or obtained by copolymerization of monomer(s) (III) or salt(s) thereof with nonioic monomer(s) copolymerizable with the monomer(s) (III) or salt(s) thereof but having neither a hydroxyl group, a glycidyl group nor an amido group, the water-soluble polymer (P2) being such that the rate of the monomer(s) (III) or salt(s) thereof in the total monomers is 40% by mol or more, the hydrophilicity of the obtained film can further be enhanced.

In the above, as the monomers (III) having in the molecule a carboxyl group, a sulfonic acid group or a phosphonic acid group and salts thereof, there can be used anionic monomers and salts thereof stated in the description of the above P1 can be used. Further in the above, as the monomers (III) having in the molecule a primary amino group, a secondary amino group, a tertiary amino group or a quaternary ammonium group and salts thereof, there can be used cationic monomers and salts thereof stated in the description of the above P1 can be used. Further in the above, as the monomers (III) having in the molecule a hydroxyl group, a glycidyl group or an amido group, and being different from monomers (I), there can be used 2-hydroxyalkyl (C=2, 3)(meth)acrylate, N-methylol(meth)acrylamide, diacetoneacrylamide, etc.

In the above, as the nonioic monomers copolymerizable with the monomers (III) but having neither a hydroxyl group, a glycidyl group nor an amido group, there is no particular limitation, but there can, for example, be mentioned styrene, alkyl (C=1 to 8) (meth)acrylate, vinyl acetate, etc.

The process of the above homopolymerization or copolymerization for obtaining the water-soluble polymer (P2) used in the invention can be the same as in the case of the water-soluble polymer (P1).

It is suitable, for securing the hydrophilicity of the film, that the molecular weight of the obtained water-soluble polymer (P2) is 1,000 or more according to gel permeation chromatography (GPC) using a polyacrylic acid ester as a standard substance. The molecular weight is preferably 1,000 to 500,000, more preferably 5,000 to 200,000.

When the water-soluble polymer (P2) is used, its use amount in the composition of the invention, based on solid matter, is suitably 1 to 400 weight parts, preferably 5 to 300 weight parts per 100 weight parts of P1.

Further, rotting odor due to metabolites of microorganisms proliferating at the fin gaps can be inhibited by incorporating an antibacterial agent having a decomposition temperature of 100° C. or more into the composition for hydrophilic treatment of the invention.

As the antibacterial agent having a decomposition temperature of 100° C. or more, there is no particular limitation, but there can, for example, be mentioned 5-chloro-2-methyl-4-isothiazolin-3-one, 2-methyl-4-isothiazolin-3-one, 2-(4-thiocyanomethylthio)benzothiazole, 2,2-dibromo-3-nitrilopropionamide, sodium ethylenebis (dithiocarbamate), sodium 2-pyridinethiol-1-oxide, 2,2'-dithiobis(pyridine-1-oxide), 2,4,5,6-tetrachloroisophthalonitrile, 2-methylcarbonylaminobenzimidazole, zinc 2-pyridinethiol-1-oxide, 2-(4-thiazolyl)-benzimidazole, p-chloro-m-xylenol, 1,2-benzisothiazolin-3-one, 2-bromo-2-nitropropane-1,3-diol, barium metaborate, 2-n-octyl-4-isothiazolin-3-one, bis(1-hydroxy-2-pyridinethionato) zinc, zeolite compounds having Ag or Cu, etc.

When the antibacterial agent is used, as to its use amount in the composition of the invention, it is sufficient if it is an amount enough to exert antibacterial effect, but, usually, the use amount is suitably 0.01 to 50 weight parts, preferably 0.1 to 50 weight parts per 100 weight parts of P1 solid matter.

Rust inhibiors, leveling agents, fillers, colorants, surfactants, antifoaming agents, etc. can be added, in such a range that the effect of the invention and film performance are not spoiled, into the composition for hydrophilic treatment of aluminum or aluminum alloy of the invention.

The solid matter concentration of the composition for hydrophilic treatment of aluminum or aluminum alloy of the invention can be such a solid matter concentration that the thickness of film formed by applying the composition once onto the surface of aluminum or aluminum alloy and drying it becomes 0.05 to 20 $\mu$m, particularly 0.1 to 5 $\mu$m.

Next, description is made on the method for hydrophilic treatment of aluminum or aluminum alloy of the invention, using the composition for hydrophilic treatment.

Matter onto which the hydrophilic treatment is to be made is aluminum or aluminum alloy, more detailedly aluminum or aluminum alloy-made materials or products. As the aluminum alloy, there is no particular limitation, but there can be exemplified aluminum alloys which are alloys of aluminum with manganese, silicon, magnesium or the like and wherein the aluminum content is 80% by weight or more, and, specifically, there can be mentioned JIS 2024, JIS 3004, JIS 5052, etc. There can be mentioned sheet materials, tubular materials, bar materials, fin materials used for heat exchangers, etc. as the aluminum or aluminum alloy-made materials, and heat exchangers, refrigerators, etc. as the aluminum or aluminum alloy-made products.

The composition for hydrophilic treatment of the invention is used particularly suitably for hydrophilic treatment of aluminum or aluminum alloy-made heat exchangers using post-coating treatment.

In application of the composition of the invention, prior thereto, degreasing, washing with water and drying are usually carried out by conventional methods.

The composition of the invention can be applied onto the surface of aluminum or aluminum alloy by a usual application method, for example by immersion, roll coating, flow coating or the like.

After the application of the composition of the invention, drying is carried out. Methods for the drying are not particularly limited, but, usually, it is suitable to carry out the drying by hot-air drying at 80 to 300° C., particularly 100 to 250° C.

It is necessary that the film thickness after the drying is 0.05 to 20 $\mu$m, and, preferably, it is 0.1 to 5 $\mu$m. In less than 0.05 $\mu$m, it is difficult to give sufficient hydrophilicity to the matter to be subjected to the hydrophilic treatment, and in more than 20 $\mu$m, there is the possibility that the heat conductivity of the matter is lowered.

Film obtained using the composition for hydrophilic treatment of aluminum or aluminum alloy of the invention does not generate odor and maintains excellent corrosion resistance and hydrophilicity, over a long period. Further, by thus giving corrosion resistance to the hydrophilic film, it became possible to omit chemical conversion treatment which has generally been carried out.

The mechanism of the corrosion inhibition effect of the hydrophilic film by the composition of the invention is not entirely made clear, but is thought to be as follows.

Although it is known that the water-soluble polymer (P1) and the water-soluble chromium (III) compound form a film having reticular structure, it is considered that the film of reticular structure is made stronger by the water-soluble zirconium compound or titanium compound (B), and thereby the progress of corrosion is hindered. Further, it is considered that, thereby, excellent corrosion resistance over a long period only by this hydrophilic film is made possible, and excellent hydrophilicity and deodorant properties can be maintained over a long period. It is considered that it is because the formed film does not contain odor components and the film prevents the generation of odor components due to corrosion, etc., that odor is not generated over a long period.

EXAMPLES

The invention is further specifically described below by examples, but these are mere exemplifications and do not imply any limitation of the invention at all Example 1

An aluminum (JIS 3003)-made heat exchanger was immersed for 50 seconds in 30 g/L aqueous solution of a weakly alkaline degreasing agent (Fine Cleaner 315, made by Nihon Parkerizing Co., Ltd.) to remove contaminants such as oily matter on the surface, and washed with city water for 30 seconds. The heat exchanger was immersed in a composition for hydrophilic treatment comprising 100 weight parts of polyacrylamide solid matter (molecular weight: about 50,000), 10 weight parts of chromium biphosphate, 10 weight parts of hexafluorotitanic acid and 5,000 weight parts of water at 25° C. for 30 seconds, drained by air blow, and heat dried for 30 minutes in an oven with internal air circulation adjusted to 140° C. to form hydrophilic film. The thickness of this film was measured using the surface carbon-measuring apparatus of LECO Co. (USA).

Example 2

The procedure of Example 1 was repeated to form hydrophlic film, except that a composition for hydrophilic treatment comprising 100 weight parts of polyacrylamide solid matter (molecular weight: about 50,000), 30 weight parts of chromium biphosphate, 30 weight parts of hexafluorozirconic acid and 5,000 weight parts of water was used in place of the composition for hydrophilic treatment of Example 1.

Example 3

The procedure of Example 1 was repeated to form hydrophlic film, except that a composition for hydrophilic treatment comprising 100 weight parts of polyacrylamide solid matter (molecular weight: about 30,000), 10 weight parts of chromium fluoride, 10 weight parts of hexafluorozirconic acid and 5,000 weight parts of water was used in place of the composition for hydrophilic treatment of Example 1.

Example 4

The procedure of Example 1 was repeated to form hydrophlic film, except that a composition for hydrophilic treatment comprising 100 weight parts of the copolymer solid matter (molecular weight: about 40,000) between acrylamide (90% by mol) and sodium 2-acrylamido-2-methylpropanesulfonate (10% by mol), 50 weight parts of chromium fluoride, 10 weight parts of hexafluorozirconic acid and 5,000 weight parts of water was used in place of the composition for hydrophilic treatment of Example 1.

Example 5

The procedure of Example 1 was repeated to form hydrophilic film, except that a composition for hydrophilic treatment comprising 100 weight parts of the sodium salt solid matter (molecular weight: about 70,000) of the copolymer between acrylamide and acrylic acid in a mol ratio of 80:20, 10 weight parts of chromium sulfate, 1 weight part of titanium sulfate and 5,000 weight parts of water was used in place of the composition for hydrophilic treatment of Example 1.

Example 6

The procedure of Example 1 was repeated to form hydrophlic film, except that a composition for hydrophilic treatment comprising the composition for hydrophilic treatment of Example 1 having added thereinto 20 weight parts of poly (sodium 2-acrylamido-2-methylpropanesulfonate) was used in place of the composition for hydrophilic treatment of Example 1.

Comparative Example 1

The procedure of Example 1 was repeated to form hydrophlic film, except that the same composition for hydrophilic treatment as in Example 1 except for not containing the polyacrylamide was used in place of the composition for hydrophilic treatment of Example 1.

Comparative Example 2

The procedure of Example 1 was repeated to form hydrophlic film, except that the same composition for hydrophilic treatment as in Example 2 except for not containing chromium biphosphate was used in place of the composition for hydrophilic treatment of Example 1.

Comparative Example 3

The procedure of Example 1 was repeated to form hydrophlic film, except that the same composition for hydrophilic treatment as in Example 3 except for not containing hexafluorozirconic acid was used in place of the composition for hydrophilic treatment of Example 1.

Comparative Example 4

The procedure of Example 1 was repeated to form hydrophlic film, except that the same composition for hydrophilic treatment as in Example 3 except that 200 weight parts of hexafluorozirconic acid was used in place of 10 weight parts of hexafluorozirconic acid was used in place of the composition for hydrophilic treatment of Example 1.

Evaluation Tests

The heat exchangers having provided film thereon, prepared in Examples 1 to 5 and Comparative examples 1 to 4, were evaluated according to the following methods.

<Test methods>

(1) Initial hydrophilicity

The contact angle against water of the fin part of each heat exchanger was measured using a FACE contact angle-type CA-P type contact angle-measuring apparatus (made by Kyowa Kaimen Kagaku Co., Ltd.).

(2) Hydrophilicity after endurance

The contact angle against water of the fin part after 72 hours immersion in running water at room temperature was measured using the above type contact angle-measuring apparatus.

(3) Corrosion resistance

In the corrosion resistance test based on the salt spray test method JIS Z-2371, the rusted area after 72 hours exposure was evaluated from appearance. The evaluation criterion is as follows.

⊚ No discoloration was observed

○ Rust is generated less than 10%

□ Rust is generated 10% or more but less than 2%

Δ Rust is generated 25% or more but less than 50%

X Rust is generated 50% or more (4) Deodorant properties

Odor after 72 hours immersion in running water (deionized water: 0.5 L/min) was evaluated in 5 stages.

The evaluation criterion is as follows.

⊚ There is no odor

○ There is slight odor

□ There is a little odor

Δ There is distinct odor

X There is strong odor

On the aluminum-made heat exchangers having hydrophlic film of Examples 1 to 5 and Comparative examples 1 to 4, the compositions of the compositions for hydrophilic treatment and the thickness of the films, and the results of evaluation according to the evaluation methods are shown together in Table 1.

As apparent from Table 1, in the aluminum-made heat exchangers treated with the compositions for hydrophilic treatment of the invention of Examples 1 to 5, the films have, even after the durability test, excellent hydrophilicity, corrosion resistance and deodorant properties. On the other hand, in the aluminum-made heat exchangers treated with the compositions for hydrophilic treatment lacking in even one of the components according to claim 1 of Comparative examples 1 to 3, at least one of the corrosion resistance, hydrophilicity and deodorant properties of the films was insufficient. Further, in Comparative example 4 where hexafluorozirconic acid was compounded in an amount of as excess as 200 weight parts, deodorant properties were insufficient.

TABLE 1

Results of evaluation of the compositions for hydrophilic treatment

| | | Composition of the composition for hydrophilic treatment (The numbers in parentheses are weight parts) | | | Film thickness ($\mu$m) | Contact angle (°) | | Corrosion resistance | Deodorant properties |
|---|---|---|---|---|---|---|---|---|---|
| | | Polymer P1 | Chromium compound A | Zirconium/titanium compound B | | Initial | After running water | | |
| Example | 1 | Polyacrylamide (100) | Chromium biphoshate (10) | Hexafluorotitanic acid (10) | 0.5 | 8 | 21 | ⊚ | ⊚ |
| | 2 | Polyacrylamide (100) | Chromium biphoshate (30) | Hexafluorozirconic acid (30) | 0.5 | 11 | 25 | ⊚ | ⊚ |
| | 3 | Polyacrylamide (100) | Chromium fluoride (10) | Hexafluorozirconic acid (10) | 1.0 | 7 | 19 | ⊚ | ⊚ |
| | 4 | Copolymer 1*[1] (100) | Chromium fluoride (50) | Hexafluorozirconic acid (10) | 1.0 | 10 | 18 | ○ | ⊚ |
| | 5 | Copolymer 2*[2] (100) | Chromium sulfate (10) | Titanium sulfate (1) | 2.0 | 12 | 21 | ○ | ⊚ |
| | 6 | Polymer mixture *[3] (100) | Chromium biphosphate (10) | Hexafluorotitanic acid (10) | 1.0 | 11 | 15 | ○ | ⊚ |
| Comparative Example | 1 | — | Chromium biphosphate (10) | Hexafluorotitanic acid (10) | 0.1 | 45 | 60 | Δ | X |
| | 2 | Polyacrylamide (100) | — | Hexafluorozirconic acid (30) | 1.0 | 21 | 53 | X | Δ |
| | 3 | Polyacrylamide (100) | Chromium fluoride (10) | — | 1.0 | 10 | 24 | Δ | ○ |
| | 4 | Polyacrylamide (100) | Chromium fluoride (10) | Hexafluorozirconic acid (200) | 2.0 | 11 | 22 | ⊚ | X |

TABLE 1-continued

Results of evaluation of the compositions for hydrophilic treatment

| | Composition of the composition for hydrophilic treatment (The numbers in parentheses are weight parts) | | | Contact angle (°) | | | |
|---|---|---|---|---|---|---|---|
| Polymer P1 | Chromium compound A | Zirconium/titanium compound B | Film thickness (μm) | Initial | After running water | Corrosion resistance | Deodorant properties |

*¹Copolymer between acrylamide (90 mol %) and sodium 2-acrylamido-2-methylpropanesulfonate (10 mol %)
*²Sodium salt of copolymer between acrylamide and acrylic acid in 80:20 (mol ratio)
*³Polymer P1:polyacrylamide (100), polymer P2:poly(sodium 2-acrylamido-2-methylpropanesulfonate (20)

Hydrophlic film obtained by treating aluminum or aluminum alloy with the composition for hydrophilic treatment of the invention shows, even after the durability test, excellent hydrophilicity, corrosion resistance and deodorant properties, although it is single-layer film.

What is claimed is:

1. A composition comprising components (P1), (A), (B) and (C) for hydrophilic treatment of an aluminum or aluminum alloy wherein:
   (P1) a water-soluble polymer obtained by a polymerization process selected from the group consisting of:
      (i) homopolymerizing a monomer (I) represented by the formula:

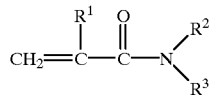

wherein $R^1$ represents a hydrogen atom or a methyl group and $R^2$ and $R^3$ are the same or different, and each represent a hydrogen atom, an alkyl group having 1 to 4 carbon atoms, a benzyl group or a hydroxyalkyl group having 2 or 3 carbon atoms,
      (ii) copolymerizing two or more of monomers (I),
      (iii) copolymerizing at least one monomer (I) with another monomer (II) copolymerizable with the monomer (I) or salt(s) of the monomer(s) (II) to provide a ratio of monomer (I) in the total monomers of 40% by mol or more, and
      (iv) subjecting the homopolymer or copolymer resulting from polymerization (i), (ii) or (iii) to a modification process selected from the group consisting of
         (1) converting amido groups to carboxyl groups by hydrolysis,
         (2) converting amido groups to amino groups by a Hofmann rearrangement,
         (3) converting amido groups to —CONH—CH$_2$—N(R$^4$)(R$^5$) by a Mannich reaction using HN(R$^4$)(R$^5$) and formaldehyde
            wherein $R^4$ and $R^5$ are the same or different, and each represents an alkyl group having 1 to 4 carbon atoms, a hydroxyalkyl group having 2 or 3 carbon atoms or a benzyl group,
         (4) introducing a —CONH—R$^6$—NH$_2$ group by reacting side chain ester groups with alkylenediamine (H$_2$N—R$^6$—NH$_2$) wherein $R^6$ represents an alkylene group having 2 to 6 carbon atoms, and
         (5) converting the amino or substituted amino groups resulting from reactions (2) to (4) to quaternary ammonium through alkylation,
   (A) a water-soluble trivalent chromium compound;
   (B) a water-soluble zirconium compound or titanium compound; and
   (C) water;
      provided that the ratio of (P1), (A) and (B) is such that, based on 100 weight parts of the solids of (P1), (A) is 0.01 to 70 weight parts and (B) is 0.001 to 70 weight parts and provided the composition is substantially completely free of a hexavalent chromium compound.

2. The composition according to claim 1 wherein monomer (I) is selected from the group consisting of acrylamide, methacrylamide, N-methlacrylamide and N,N-dimethylacrylamide.

3. The composition according to claim 1, which further contains a second water-soluble polymer (P2) in an amount of 1 to 400 weight parts based on 100 weight parts of (P1) in solid weight basis, wherein (P2) a water-soluble polymer obtained by
   homopolymerization of a monomer (III) or a salt thereof having in each molecule a carboxyl group, a sulfonic acid group, a phosphonic acid group, a primary amino group, a secondary amino group, a tertiary amino group, a quaternary ammonium group, a hydroxyl group, a glycidyl group or an amido group, provided that monomer (III) is different from monomer (I),
   copolymerization of two or more of monomers (III) and salts thereof, or copolymerization of monomers (III) or salts thereof with a nonioic monomer copolymerizable with the monomer (III) or salts thereof provided it has neither a hydroxyl group, a glycidyl group nor an amido group,
   wherein the ratio of monomer (III) or salts thereof to the total monomers in polymer (P2) is 40% by mol or more.

4. A composition according to claim 3 wherein the nonioic monomer copolymerizable with the monomer (III) or salts thereof is selected from the group consisting of styrene, alkyl (C=1 to 8) (meth)acrylate and vinyl acetate.

5. The composition according to claim 1 which further contains an antibacterial agent having a decomposition temperature of 100° C. or more.

6. The composition according to claim 3 which further contains an antibacterial agent having a decomposition temperature of 100° C. or more.

7. The composition according to claim 1, wherein the water-soluble polymer is the one obtained by copolymerizing monomer (I) with monomer (II), and monomer (II) is selected from the group consisting of 2-hydroxyalkyl (C=2 or 3) (meth)acrylate, diacetoneacrylamide, N-methylolacrylamide, acryloylmorpholine, acrylonitrile, alkyl (C=1 to 6)(meth)acrylate, styrene, vinyl acetate, a monomer represented by the formula:

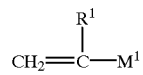

wherin R¹ represents a hydrogen atom or a methyl group, and M¹ represents one of the following groups:

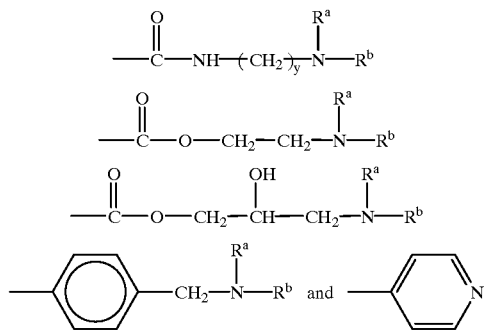

wherein $R^a$ and $R^b$ are the same or different, and each represents a hydrogen atom, an alkyl group having 1 to 6 carbon atoms, a hydroxyalkyl group having 1 to 6 carbon atoms, a phenyl group or a benzyl group, and y represents an integer of 1 to 3,
a monomer represented by the formula

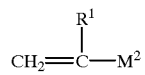

wherein R¹ represents a hydrogen atom or a methyl group, and M² represents one of the following groups:

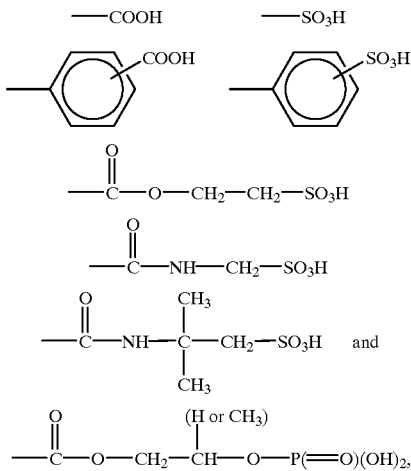

maleic anhydride and itaconic acid.

8. The composition according to claim 3 wherein the monomer (III) is selected from the group consisting of a monomer represented by the formula:

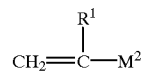

wherein R¹ represents a hydrogen atom or a methyl group, and M² represents one of the following groups:

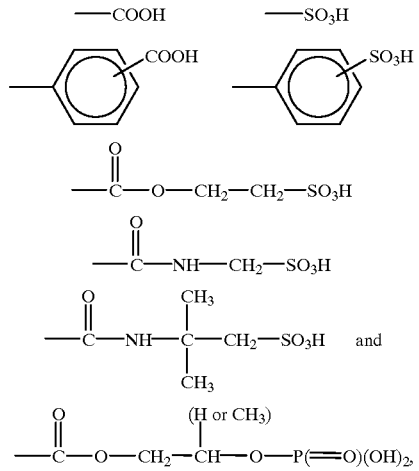

maleic anhydride and itaconic acid,
a monomer represented by the formula:

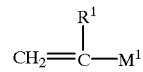

wherein R¹ represents a hydrogen atom or a methyl group, and M¹ represents one of the following groups:

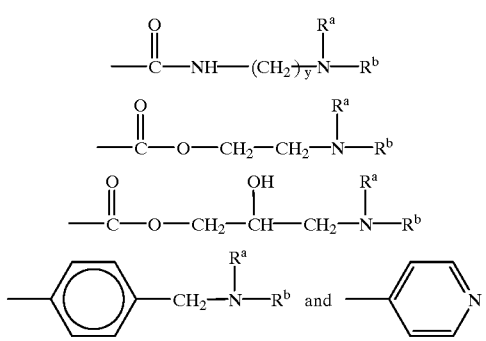

wherein $R^a$ and $R^b$ are the same or different, and each represents a hydrogen atom, an alkyl group having 1 to 6 carbon atoms, a hydroxyalkyl group having 1 to 6 carbon atoms, a phenyl group or a benzyl group, and y represents an integer of 1 to 3, and 2-hydroxyalkyl (C=2 or 3) (meth)acrylate, N-methylolacrylamide and diacetoneacrylamide.

* * * * *